RICHARD KEITH HODKIN
INVENTOR
by Irwin J. Thompson
ATTORNEY

Jan. 26, 1960  R. K. HODKIN  2,922,312
CONTROL APPARATUS FOR VARIABLE RATIO
POWER TRANSMISSION MEANS
Filed July 11, 1957  3 Sheets-Sheet 2

Richard Keith Hodkin
INVENTOR
by Irwin S. Thompson
ATTORNEY

United States Patent Office 2,922,312
Patented Jan. 26, 1960

2,922,312

CONTROL APPARATUS FOR VARIABLE RATIO POWER TRANSMISSION MEANS

Richard Keith Hodkin, Dunstable, England, assignor to Engineering Research and Application Limited, a British company Application July 11, 1957, Serial No. 671,242

Claims priority, application Germany July 12, 1956

5 Claims. (Cl. 74—336.5)

This invention relates to control mechanism for controlling variable ratio transmission gearing for motorcars and other engine driven vehicles, the gearing being of the kind having stepped ratios.

The main object of the invention is to enable the driver by a simple movement to effect rapid and smooth changes of ratio up or down without danger of damage to the gearing or to the engine.

According to the invention the control mechanism comprises servo means for moving a gear shift member in both directions along one line of movement, gear shift control means for moving or controlling the direction of movement along a line transverse to the first line of movement, said servo means and control means being both electrically controlled, first switch means 13 which the operator may close for up changes, second switch means 12 which the operator may close for down changes, and switching means whereby the servo means and control means are controlled by operating said first and second switch means for effecting a succession of up changes when the first switch means is held closed and for effecting a succession of down changes when the second switch means is held closed.

A first governor controlled switch may be provided for preventing a down change if the input shaft of the gearing has a speed above a predetermined maximum speed for down changing. A second governor controlled switch may be provided for effecting up changes if the input shaft speed is above a predetermined maximum and the gearing is not already in top gear. A further overriding governor controlled device may effect a change down if the speed of the input shaft falls below a predetermined minimum.

Thus the driver can instantly bring about one or more up changes or down changes through servo means but cannot produce undesirably low or high engine speeds by such changes.

The servo means may operate switch devices for disengaging the clutch while effecting ratio change and re-engaging the clutch automatically upon completing the ratio change.

The servo means may actuate a switch device for disconnecting the first switch means and second switch means from the servo means while effecting a ratio change and maintaining current supply to the servo means through other switch means during ratio change and re-connecting the servo means to the first and second switch means when the change has been made.

A constructional form of the invention is illustrated in the accompanying diagrammatic drawings wherein.

A general description of the mechanism is contained in the specification of my co-pending patent application No. 671,318, filed July 11, 1957, now issued as Patent No. 2,881,625 on April 14, 1959, but some further description will now be given with special reference to the manual control.

Figure 1:
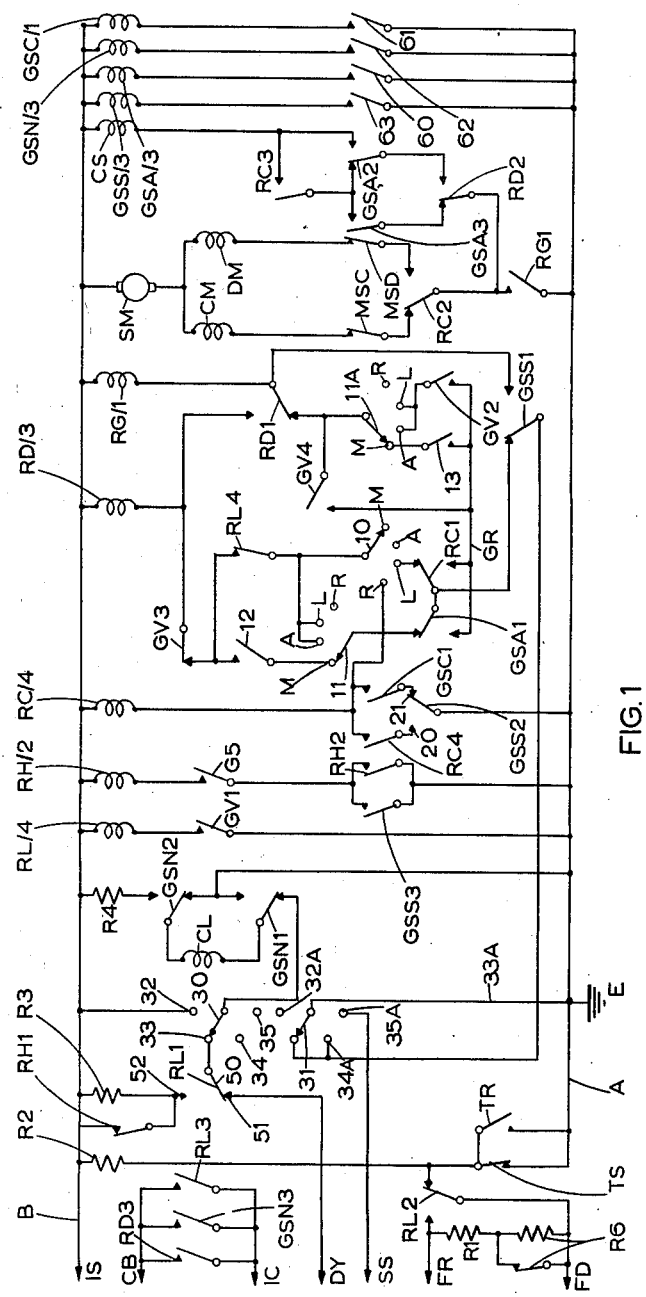
Figure 1 is an electrical circuit diagram of a control mechanism made in accordance with the invention.
Figure 2:
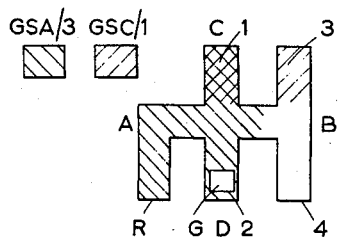
Figure 2 is a view of the various possible movements of a gear change member.
Figure 3:
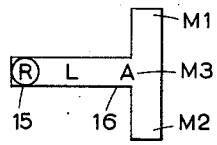
Figure 3 is a view of a gate for a manual control lever.
Figure 5:
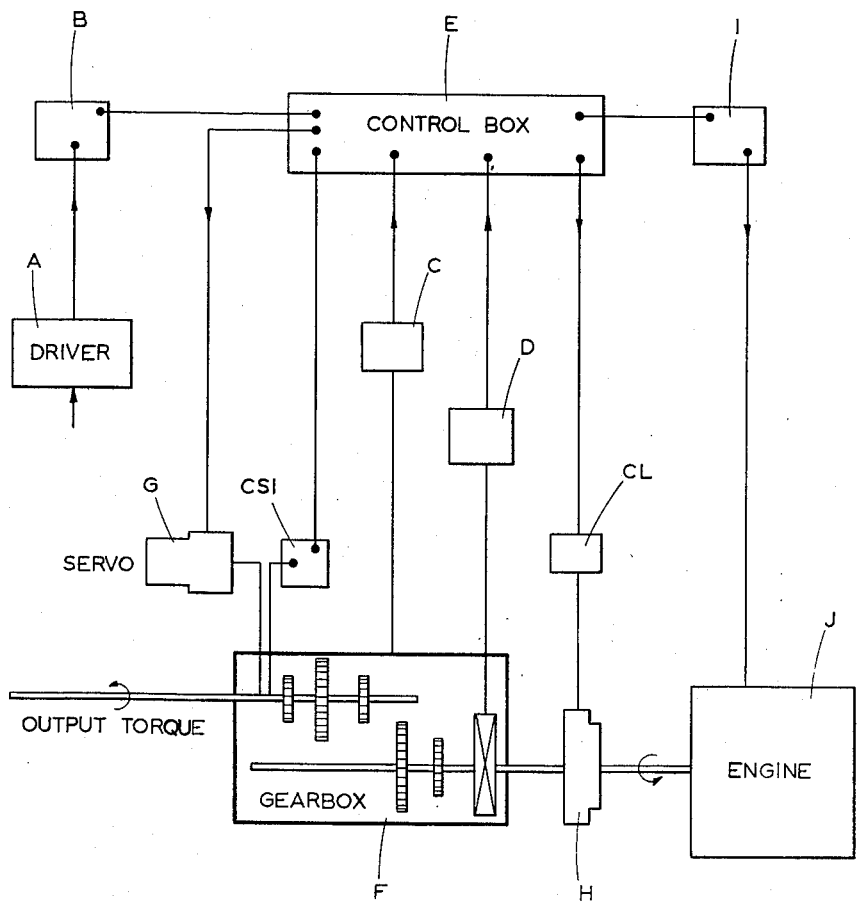
Figure 5 is a schematic diagram of the control apparatus including all of its associated components.

Fig. 5 diagrammatically illustrates the application of the present invention, in which:

A is a collection of parts operated by the driver viz. the parts of Fig. 1 referenced TS, TR, 30, 31, 10, 11, 11A, 12, 13, FD and giving signals to the control box E which consists of the parts RL/4, RH/2, RC/4, RD/3, RG/1, GSS/3, GSA/3, GSN/3, GSC/1, R1, R2, R3, R4, R6.

C is a device (60, 61, 62, 63) giving control signals from the gear box F to the control box E according to gear positions.

D is a device (GV1, GV2, GV3, GV4) giving control signals from the gear box (according to output speeds) to the control box.

The control box then gives out the following:

Signals to the servo G (CM, SM, DM) to the gear box input gear change. Signals to device CSI to the gear box input gear change.

Signals to clutch control device CL to clutch H.

Signals to device I (CB, IC, DY, SS, FR, FD) to control the ignitions and dynamo of the engine J.

The operator can place a control member 15 in any of six positions in the gate 16, viz. positions marked R, L, A, M3, M1, M2, indicating respectively reverse, low gear, automatic, manual, down changes and up changes. The control member moves switches 10, 11, 11A to the corresponding positions R, L, A, M and at position M1 closes switch 12 and at position M2 closes switch 13 (12 being open). In the positions M3, M1, M2 the switches 10, 11, 11A, remain in their M positions.

If the gearing is operating in top (4th) gear and the driver moves control member 15 to M1 this closes switch 12 and a connection is made from earth E through 33A, GSS1, GSA1 and the coil RD/3 to the battery lead B. RD/3 then reverses switches RD1, RD2, RD3, and current passes over RD1 to coil RG/1 which closes switch RG1 and operates the motor SM and solenoid CS to move the gear shift member G to the 3rd gear position. At the beginning of this movement of the member G the coil GSS/3 is energized which reverses switch GSS1 thereby disconnecting switch 12 from the motor SM and connecting coil RG/1 direct between battery and earth whereby the motor and solenoid continue to operate to complete the change unhindered by any other signal which might otherwise have been directed to them through GSA1. At the end of the change the motor causes GSS/3 to be de-energized so that switch GSS1 returns ready for another change and coil GSC/1 is energized so as to operate switch GSC1 to energize coil RC/4 whereby switches RC1, RC2, RC3, RC4 are reversed to reset the circuits for another change (suitable for a succeeding change either up or down). If the driver still holds the control 15 at M1 another down change will normally occur. No such down changes will occur however if the input shaft speed is already in excess of a predetermined maximum for down changes (e.g. 2800 r.p.m.) because the governor switch GV3 will then be open thereby breaking the circuit between switch 12 and the coil RD/3. If at any time the input shaft speed exceeds a predetermined maximum the governor operated switch GV4 closes and (if not already in top gear) establishes a current path from battery lead B, coil RG/1, switches RD1, GSA1 or RC1, GSS1 and 31 to earth. Coil RG/1 is energized and operates switch RG1 to cause the servo means SM, CS to effect an up change.

If the transmission is in second gear the switch GSA1 will be in the reverse position to that shown in the drawing. If now the control 15 is moved to M2, the switch 13 closes and connects coil RG/1 to earth via GSA1, GSS1 and 31. Coil RG/1 closes switch RG1 and energizes the motor which moves the gear shift element from D to C while the spring associated with solenoid CS moves said element from A to B. Towards the end of this movement, coil GSC/1 is energized to change switch GSC1 which when GSS2 reverses energizes coil RC/4 which again reverses switches RC1, RC2, RC3, RC4 ready for the next change up or down. If the control 15 is maintained at M2, a further current impulse passes over RG1, RC2 but as the latter has been reversed the motor moves the gear shift element from C to D so that GSC1 is open which when GSS2 reverses energizes RC/4 and the switches RC1, RC2, RC3, RC4 are again reversed. Meanwhile the solenoid remains de-energized.

Thus the operator has control for obtaining a succession of up changes or down changes through the servo means subject to the automatic overriding control of the governor controlled switches GV3, GV4.

In the position M1, a change down is effected unless the gear is already in 2nd gear in which case a signal to change down is prevented because the switch GSA1 is in its reversed position as compared with the position shown.

The control member 15 will be returned from M1, M2 to position M3 by springs unless it is held in these positions so that if the operator moves it to M1 or M2 momentarily and allows it to return only a single change will be effected. If he holds member 15 at M1 a succession of changes will occur down to 2nd gear and if he holds member 15 at M2 a succession of changes occurs to top gear, subject to the previously mentioned overriding controls.

A further overriding control is provided by the governor operated switch GV1 which produces a change down when input shaft speed falls below a predetermined minimum (e.g. 1000 r.p.m.) even if member 15 is at M, M1, or M2 and provided that the gearing is not already in 1st or 2nd gear.

Simultaneously with the gear changes the clutch is disengaged and re-engaged, the ignition is switched off and on again, and other parts are controlled as more fully described in the specification of my aforesaid Patent No. 2,881,625.

Figure 4:
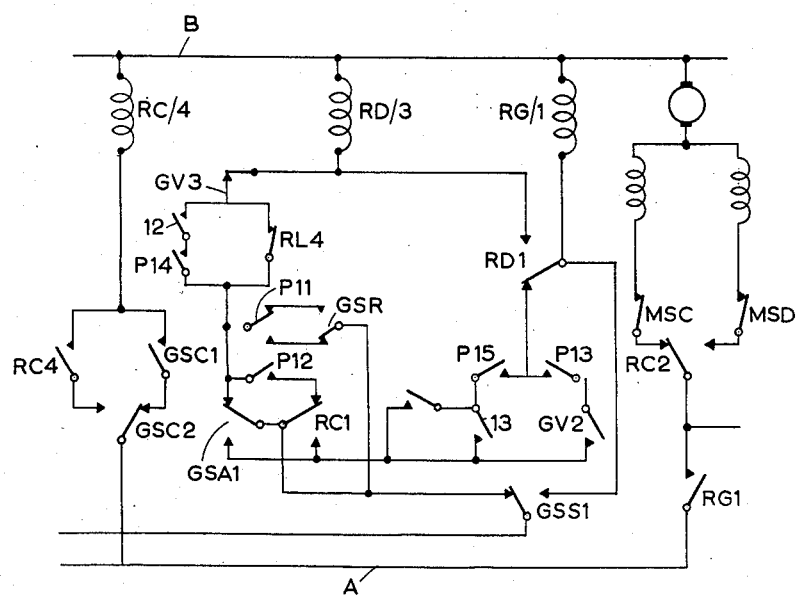
Figure 4 is a modified part of the circuit shown in Figure 1.

In the modification shown in Figure 4 the ganged switches 10, 11, 11A are replaced by the following switches:

P11 for connecting coil RD/3 to earth so as to energize the motor to obtain reverse gear.

P12 for connecting coil RD/3 to earth so as to energize the motor to obtain low gear.

P13 for connecting the governor controlled switch GV2 into circuit, the governor serving to close the switch above a predetermined speed of the input shaft of the gearing so as to control the motor and solenoid to effect down changes, thus rendering the gear automatic.

P14 and P15 to connect the switches 12 and 13 operatively into the control circuits.

These switches are operated by four push buttons which being of known type are not shown. They are of the kind which each remains in its actuated position when pressed but returns to normal position when another is actuated. Three of these members actuate respectively the switches P11, P12, P13 and the fourth actuates both switches P14 and P15.

Instead of an electric motor and solenoid, the servo means may comprise pneumatic or hydraulic ram or rams or bellows controlled by electrically operated valves.

Having described my invention, I claim:

1. A control mechanism for controlling variable ratio transmission gearing having stepped ratios comprising servo means for moving a gear shift member in both directions along one line of movement, gear shift control means for moving or controlling the direction of movement along a line transverse to the first line of movement, said servo means and control means being both electrically controlled, first switch means which the operator may close for up changes, second switch means which the operator may close for down changes, and switching means whereby the servo means and control means are controlled by operating said first and second switch means for effecting a succession of up changes when the first switch means is held closed and for effecting a succession of down changes when the second switch means is held closed; said switching means comprising fifth switch means for maintaining current supply to the servo means during ratio change, a switch operating device for disconnecting the first switch means and second switch means from the servo means while effecting a ratio change, and operating said fifth switch means to maintain current supply to the servo means during ratio change, and operating said fifth switch means to reconnect the servo means to the first and second switch means when the ratio change has been made.

2. A control mechanism as claimed as in claim 1 wherein a manually movable element is movable to an "automatic" position, or to a position to close the first switch means, or to a position to close the second switch means, and in all three positions control the same servo means for effecting gear changes.

3. A control mechanism as claimed in claim 1 wherein the servo means comprise a reversible electric motor and a reversing switch therefor is controlled by a relay coil which in turn is controlled by a switch which is closed in accordance with the movements of the gear shift member.

4. A control mechanism as claimed in claim 2 wherein the manually movable element is movable to another position in which it controls the servo means and control means to move the gear shift member to low gear position unobtainable in the other positions of the said element.

5. A control mechanism as claimed in claim 1 having a governor controlled switch and separate manually operable members as follows, viz. (1) for switching current on to the servo and control means for effecting low gear, (2) for connecting a governor controlled switch into the switching means, said switch closing above a predetermined speed of the input shaft of the gearing to effect automatic up changes, and (3) closing two switches which bring said first switch means and said second switch means respectively into operative circuit, each said members being returned when another of said members is actuated.

References Cited in the file of this patent
UNITED STATES PATENTS

| | | |
|---|---|---|
| 2,235,943 | Mylius | Mar. 25, 1941 |
| 2,562,366 | Prather | July 31, 1951 |
| 2,605,874 | Price | Aug. 5, 1952 |
| 2,737,059 | Perkins | Mar. 6, 1956 |